Dec. 6, 1960 W. M. BROOKS ET AL 2,962,824
TAG
Filed Jan. 5, 1954 3 Sheets-Sheet 1

INVENTORS
WINFRED M. BROOKS
SIGURD M. MOBERG
BY
Robert Henderson
ATTORNEY

Dec. 6, 1960  W. M. BROOKS ET AL  2,962,824
TAG
Filed Jan. 5, 1954  3 Sheets-Sheet 2

INVENTORS
WINFRED M. BROOKS
BY SIGURD M. MOBERG

Robert Henderson
ATTORNEY

Dec. 6, 1960 — W. M. BROOKS ET AL — 2,962,824
TAG
Filed Jan. 5, 1954 — 3 Sheets-Sheet 3
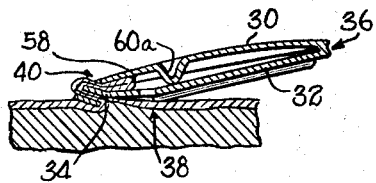
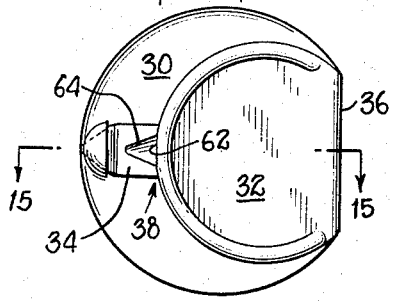
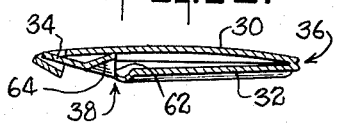
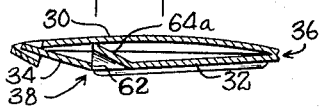
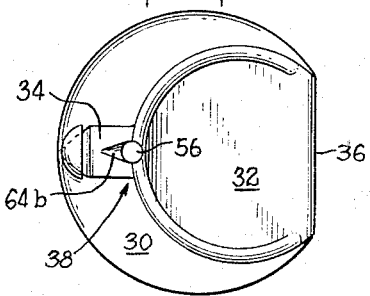
INVENTORS
WINFRED M. BROOKS
BY SIGURD M. MOBERG
Robert Henderson
ATTORNEY United States Patent Office 2,962,824
Patented Dec. 6, 1960

2,962,824
TAG

Winfred M. Brooks, West Orange, and Sigurd M. Moberg, Pompton Plains, N.J., assignors to E. J. Brooks Company, Newark, N.J., a corporation of New Jersey Filed Jan. 5, 1954, Ser. No. 402,338

4 Claims. (Cl. 40—23)

This invention relates to tags such as may be applied to merchandise to identify it with reference to a trademark, grade mark or other information of interest to persons to whom the merchandise may pass in the course of trade. For purposes of illustration, the invention is disclosed and described herein in a form suitable for use on poultry but without limiting the invention to that particular line of merchandise or to the particular structures illustrated and described herein.

An important object of the invention is the provision of such a tag which may be quickly applied to merchandise and be held securely thereon against accidental separation therefrom, but which, nevertheless, may be very easily and quickly removed.

Another important object is the provision of such a tag having, as a part thereof, stop means which positively prevent the tag from being fixed so tightly upon the merchandise as to cause objectionable damage thereto.

Another important object is the provision of such a tag in which, when applied to merchandise, certain parts thereof are sufficiently spaced positively from each other to receive a knife or other instrument therebetween for prying the tag open for removal.

Another important object is the provision of such a tag having stop means for positively preventing it from being too tightly fixed upon the merchandise, which means serve additionally as means affording structural reinforcement for certain parts of the tag.

Another important object is the provision of such a tag having such stop means which may be provided without incurring material additional manufacturing costs.

The foregoing and other more or less obvious objects may be derived from the present invention of which, for illustrative purposes, several of numerous possible embodiments are shown in the accompanying drawings, in which.

Figs. 7–11, inclusive, are central sectional views of the tag at successive steps of its application to an article of poultry.

Figure 12:
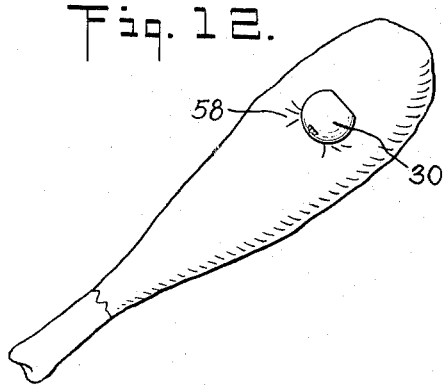

Fig. 12 is a front view of the tag as it may appear when applied to a leg of an article of poultry.

Figs. 13, 14 and 15, 16, 17, and 18 are views illustrating several of numerous possible modifications of the invention.

Referring, first, to the embodiment illustrated in Figs. 1–11, the tag comprises a piece of sheet material which is relatively stiff and non-resilient, yet bendable, as, for example, rather thin sheet metal; this piece of sheet material being cut and shaped, as shown, into a main member 30, a clasp member 32, and a prong member 34, bendable at a transversely extending hinge axis at 36 where the members 30 and 32 adjoin and another transversely extending hinge axis at 38 where the members 32 and 34 adjoin.

The main member 30, ordinarily, is the front part of the tag and is preferably dished slightly as shown to enhance its rigidity and also to effect some recession of the outer edge of said member to obviate the possibility that one handling merchandise with the tag applied thereto might be scratched accidentally by the edge of the tag. Any desired printed matter (not shown) such as trade or grade marks, etc., may be applied to the outer or convex face of said main member.

A suitable prong-receiving recess 40 is formed in main member 30, adjacent the latter's edge and opposite the axis 36. One way in which this recess may be formed is by cutting a slit 42 in the member 30 and by pushing inwardly a more or less semi-circular portion 44 of the latter member, thereby forming an aperture 46 into which the prong 34 may extend as hereinafter described.

The clasp member 32 may be left substantially flat but may be reinforced by a partially peripheral bead 48 pressed therein. Printed matter may also be applied to the outer side of the clasp member, if desired.

The prong member 34 is preferably formed with a bluntly pointed end 50 and with a transverse bend 52, causing the outermost end of the prong member to extend outwardly relatively to the rest of said member to facilitate guidance of the prong into the aperture 46 in the use of the tag in the manner hereinafter explained.

The tag, preferably, is scored at one side thereof along the axis 36, as at 54, to facilitate bending of the tag at that point but, nevertheless, weakening the tag at said axis sufficiently that if one attempts to use the tag repeatedly, the members 30 and 32 will break apart. The tag, also, is preferably weakened at the axis 38, a small punched hole 56 being suitable for this purpose. The provision of this hole has the effect of permitting the prong member 34 to bend more freely relatively to the clasp member 32 without, however, weakening the material at the latter bending point sufficiently to cause the prong member to break off.

The device, as thus far described, is very similar, fundamentally, to a tag which is disclosed in copending application of Sigurd M. Moberg, Serial No. 278,555, filed March 26, 1952, now Patent No. 2,686,379, dated August 17, 1954. Tags according to the present invention, however, include a further improved feature to be hereinafter explained, but an understanding of such further improvement may best be had from an explanation of the operation of the device as thus far described. To afford such an understanding, reference is made to Figs. 7–12, inclusive.

Figure 1:
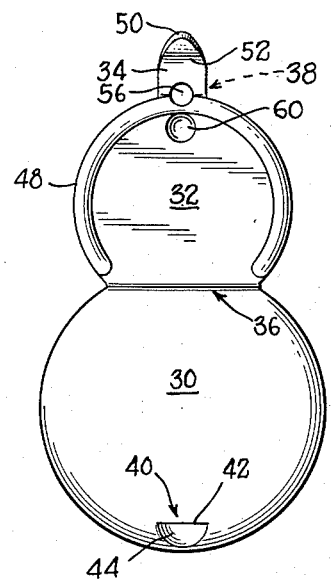
Figure 1 is an elevational view of one face of a formed, but not yet folded, tag according to a preferred form of the present invention; this tag being shown also in Figs. 2–11, inclusive.
Figure 2:
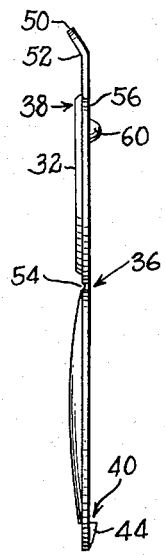
Fig. 2 is a side-edge view of the tag as viewed from the right side of Fig. 1.
Figure 3:
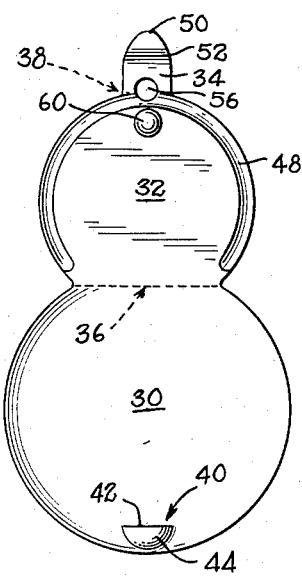
Fig. 3 is an elevational view of the opposite face of the tag.
Figure 4:
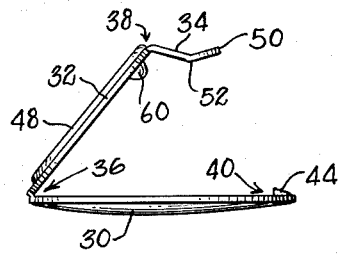
Fig. 4 is a side-edge view of the tag in its initially folded or bent but open condition, in readiness for application to a piece of merchandise.
Figure 5:
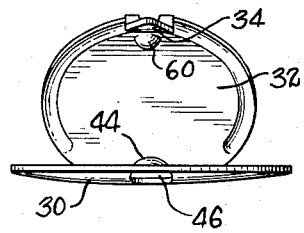
Fig. 5 is an elevational view of the initially bent tag as viewed from the right side of Fig. 4.
Figure 6:
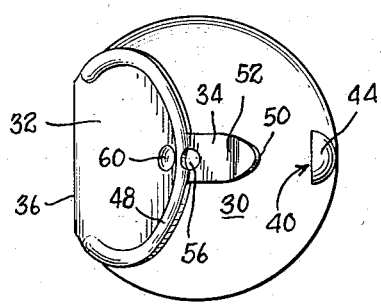
Fig. 6 is an elevational, back view of the tag as viewed from the top of Figs. 4 and 5.
Figure 7:
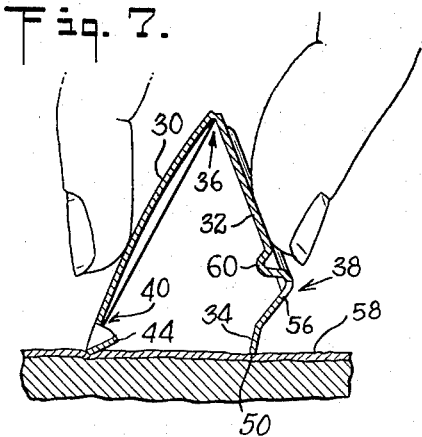
Figure 8:
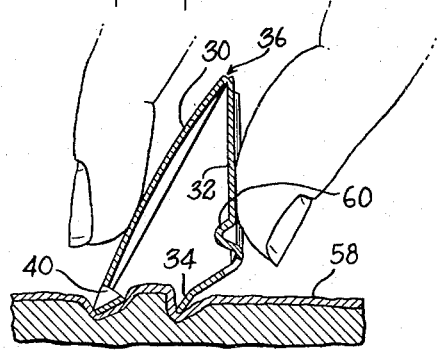
Figure 9:
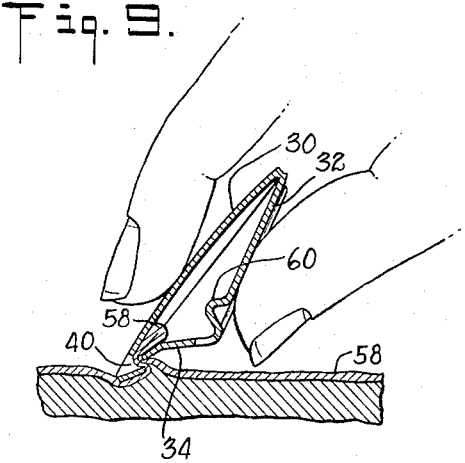

In Fig. 7, the tag is illustrated in its open form, being initially pressed against the skin 58 of a chicken or other fowl with the free edge of member 30 and the blunt point 50 of the prong member 34 in engagement with such skin at two separated points. With the tag thus held against the skin 58, the user, as shown in Fig. 8, presses the clasp member 32 toward the main member 30, this having the effect of causing a portion of the skin 58 to be gathered between the main member 30 and the prong member 34. Continued pressing of the clasp member 32 toward the main member 30, as shown in Fig. 9, causes the gathered skin to fold or double up and the blunt point of the prong member 34 to partially embed itself into the folded skin, whereupon the outwardly bent end of the prong member 34 coacts with an inner surface of the main member 30 to derive guidance into the aperture 46 with the thin doubled portion of the skin which then covers the blunt point 50. However, a substantial part of the gathered skin remains between the main member 30 and prong member 34. Under continued pushing of the clasp member 32 toward the main member 30, the clasp member 32 and the prong member 34 tend to flatten out by bending relatively to each other to some extent at the axis 38. This has the effect of increasing the overall dimension of the tag from the blunt point 50 of the prong member to the axis 36 so that the prong is held in the aperture 46; and there is no substantial force present having any material tendency toward reversing the just-mentioned bend imparted to the tag at the axis 38. Hence, the tag may not become accidentally disassociated from the fowl.

Figure 10:
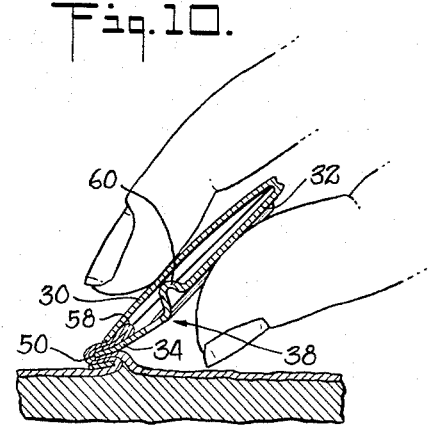
Figure 11:
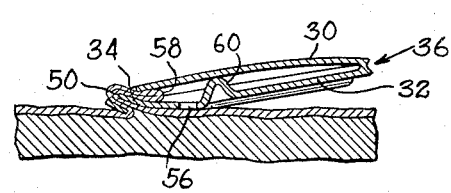

As shown in Figs. 10 and 11, the prong member 34 may become flattened to some extent at the bend 52 as the prong member is forced into the aperture 46, although the relative shapes of adjacent parts may be such that the bend 52 may substantially remain in the prong member when the device is closed in the manner just described. A fully applied tag tends to lie intimately against the fowl as shown in Figs. 11 and 12.

Having in mind that such tags are usually applied rather hurriedly to fowl in commercial operations, it will be understood that the prong member 34 may gather only a very small area of skin and that the small gathered skin portion which remains between the prong member 34 and main member 30 may not be sufficient to prevent the clasp member 32 and said prong member from completely flattening out and/or moving inwardly with respect to the main member 30 to form a reverse bend at axis 38.

The parts thus far described in this specification and the parts of the structure described in the mentioned copending application are so proportioned and arranged that, unless the prong member 34 gathers too little of the skin, the skin underlying the prong will suffice to prevent the mentioned flattening and/or reverse bending of the clasp member and the prong member. It is highly desirable, however, to provide, in the tag itself, deformations which will give assurance that the clasp and prong members may never flatten out or asume such a reverse bend when applied to the fowl, irrespective of the amount of skin gathered between the prong and main member 30.

The present invention provides the desired positive means for preventing such flattening or reverse bending of the clasp member and prong at the axis 38. That positive means, in the embodiment illustrated in Figs. 1–11, inclusive, consists of a rather deep dimple 60 which is pressed inwardly into the clasp member 32 preferably in line with the blunt pointed end 50 of the prong and hole 56 and close to the latter. Figs. 10 and 11 show how the dimple 60 restricts the bending of the clasp and prong members so that the two latter members cannot assume an angularity of as much as 180° at the sides thereof which are nearest to the main member 30. In those figures, the apex of dimple 60 is in engagement with the back of the main member 30 and obviously it would be impossible, in any proper usage of the device, for the clasp member 32 and the prong member 34 to flatten out and, of course, the two latter members could not possibly assume a reverse bend at axis 38.

Even though an excessive amount of skin should be gathered by the prong and forced between the clasp member 32 and the main member 30, that condition still would not prevent the device from being closed sufficiently to prevent it from accidentally opening, because, even with such an excess of skin in back of the clasp member, it might not find its way between the dimple and the main member 30. However, if some skin did find its way to that point, the dimple, preferably, would be small enough in diameter that it would embed itself to a considerable extent into the very soft skin of the fowl.

The same objective of preventing flattening or reverse bending of the clasp and prong members is achieved by the various other embodiments of the invention as illustrated in Figs. 13–18.

In the embodiment illustrated in Fig. 13, a similarly functioning dimple 60a is pressed inwardly into main member 30 preferably directly opposite to a point on clasp member 32 adjacent to axis 38. The engagement of the apex of this dimple with the clasp member 32 affords positive assurance against flattening or reverse bending of the clasp and prong members.

It may be understood from the foregoing that the dimple 60 or 60a may be formed simultaneously with the stamping-out and/or forming of the device as a whole, as it is a simple matter to include dimpling formations in the dies employed to stamp or form the tag. As a further variation, such dies may be so designed as to form an equivalent of the mentioned dimples as a part of the metal which defines a hole which is the functional equivalent of the hole 56. Such arrangements are illustrated in Figs. 14–18, inclusive.

In the embodiment of Figs. 14 and 15, the weakening of the metal at axis 38 is accomplished by cutting a slit 62 along said axis and somewhat shorter than the width of the prong member 34. In the formation of this slit, a more or less triangular portion of metal in the prong member 34 and bordering one side of said slit is pressed inwardly, as shown at 64, forming a detent the apex of which engages main member 30, as may be understood from Fig. 15, so that detent 64 functions similarly to the dimples 60 and 60a as a positive means for preventing the flattening out or reverse bending of the clasp and prong members 32, 34.

The embodiment illustrated in Fig. 16 differs from that of Figs. 14 and 15 only in that a detent 64a is pressed into the clasp member 32 rather than into the prong member 34.

In the embodiment illustrated in Fig. 17, an inwardly pressed detent 64b is formed in the prong member as in the embodiment of Figs. 14 and 15, but, in this instance, a complete hole 56 is cut out at the axis 38, as in the embodiment of Figs. 1–11 and 13; the detent 64b being formed in metal which immediately borders and partially defines the hole 56.

The embodiment illustrated in Fig. 18 differs from that of Fig. 17 only in that a detent 64c is pressed inwardly into the clasp member 32 rather than into the prong member. In this embodiment, also, the mentioned detent immediately borders upon and partially defines a complete cut-out hole 56 at axis 38.

An important advantage of the present invention may be understood by reference to Fig. 18, wherein is shown a fragmentary end portion 74 of a knife blade inserted between the opposing inner faces of the main member 30 and the clasp member 32. By using such a knife or equivalent instrument, it is a simple matter to pry the two said members apart, causing prong member 34 to withdraw from aperture 46 and thereby disassociating the tag from a fowl to which it has been applied. Where one attempts to use a knife in this fashion with a tag in which the clasp and prong members have assumed a reverse bend, the two latter members lie in such close relationship to the main member that it is practically impossible or, to say the least, extremely difficult to thus insert a knife in order to pry the device open. When the tag employed, however, is one according to the present invention wherein such reverse bending of the clasp and prong members is positively prevented, there is inevitably such a space between the clasp and prong members and the main member that a knife or equivalent prying instrument may easily be inserted in the manner described in order to pry the tag apart to remove it from the fowl or other merchandise to which it has been applied.

It should be borne in mind that it is desirable that such a tag be removed from a fowl during the preparation of the latter for cooking. It would certainly be very annoying to find that a tag on the fowl could not readily be removed therefrom and might possibly have to be removed by cutting of surrounding skin. Such cutting away of skin is highly undesirable. It is wholly unnecessary when tags according to the present invention are employed, because the one preparing the fowl for cooking usually has a knife at hand and can quickly remove the tag without any exasperating difficulties.

From the foregoing description, it should be clear that a certain amount of skin underlies the prong member 34 and, in instances where a very substantial amount of skin has been gathered within the tag, such skin may underlie portions of the clasp member 32. The skin of the fowl, of course, is very soft and if the tag lacks the features of the present invention and is such that its prong and clasp members may assume a reverse bend as hereinbefore discussed, the prong member, and possibly also a portion of the clasp member, embeds itself very deeply into the soft skin lying thereunder.

Ordinarily, these tags are stamped from sheet metal which has previously been lithographed and treated with anti-corrosion surfacing material. When the tags are cut out of the sheet metal, however, the cutting exposes edges of the metal which are not protected against corrosion. Thus, where the prong member or the latter and portions of the clasp member are embedded into underlying skin, as is almost certain to happen in the absence of the present invention, the exposed edges of those members corrode rapidly and cause rust marks on the skin of the fowl. Such rust marks are unsightly after the tag has been removed and, irrespective of the extent of actual damage caused by such rust marks, many persons preparing fowl for cooking would be apprehensive as to the possibility of such damage and probably would cut away the rust-marked portions of the fowl's skin. Such cutting-away of the skin often impairs the cooking of the fowl in that juices which preferably should be retained within the skin are allowed to escape.

When anti-flattening or anti-reverse bending means are employed according to the present invention, the prong and clasp members do not embed themselves materially into the skin of the fowl and, hence, any corrosion which might take place at the edges of those members would not be communicated to the skin of the fowl. Incidentally, it is probable that where such metal edges become embedded in the skin of the fowl, the moisture within the skin accelerates corrosion, while, in tags according to the present invention, such edges are not subjected to immediate contact with moisture within the fowl's skin and, therefore, the tendency toward corrosion is greatly reduced.

In the provision of tags for merchandise, a prime consideration is that the application and removal of the tags should not have any detrimental effect upon the merchandise. Where a tag is such as to be difficult either to apply to the merchandise or to remove it therefrom, the merchandise is almost certain to become damaged. Such detriment to fowl or other merchandise is substantially avoided by the use of tags according to this invention because they can be easily applied and removed.

It should be observed that tags may be made to include the improvements of this invention without any material increase in the cost of manufacture.

Enough illustrative embodiments have been shown and described herein to make it clear that the present invention lends itself to usage in substantial variations without, however, departing from the invention as set forth in the following claims.

What we claim is:

1. A tag of relatively stiff but bendable sheet material comprising a main member, a clasp member and a prong member bendably interconnected serially in the order just named, the main member having a prong-receiving recess toward its free end and the prong member being adapted, when the clasp and prong members are bent toward said main member, to coact with material of the main member, bordering said recess, to bend, at its interconnection with the clasp member, toward a greater angularity relatively to the latter, and to derive guidance into said recess, and the prong member, when thus bent, being adapted to coact with merchandise material adjacent said recess to secure the tag to such merchandise, the tag being characterized in having a rigid, bend-limiting, abutment formation, projecting from a surface of one of the three mentioned members, and having an apex adapted to engage one of the others of said members to positively restrict such bending of all said members relatively to each other and to positively limit the relationship of the clasp and prong members to an angularity which is less than 180° at the faces thereof which are nearest to the main member; said tag further having an aperture at the bendable interconnection between the clasp and prong members, and the abutment formation including material which partially defines said aperture.

2. A tag according to claim 1, the abutment formation being a ridge which extends substantially in line with said aperature and the free extremity of the prong member and serves additionally as means for reinforcing the member on which it is located.

3. A tag according to claim 2, said ridge being on the prong member.

4. A tag according to claim 2, said ridge being on the clasp member.

References Cited in the file of this patent

UNITED STATES PATENTS

| | | |
|---|---|---|
| 1,066,832 | McCallum | July 8, 1913 |
| 1,158,940 | Litt et al. | Nov. 2, 1915 |
| 1,814,436 | De Saussure | July 14, 1931 |
| 2,246,572 | Canter | June 24, 1941 |
| 2,487,419 | Brooks | Nov. 8, 1949 |
| 2,590,883 | Nierhaus | Apr. 1, 1952 |
| 2,611,200 | Ashton | Sept. 23, 1952 |

UNITED STATES PATENT OFFICE
Certificate of Correction

Patent No. 2,962,824　　　　　　　　　　　　　　　　December 6, 1960

Winfred M. Brooks et al.

It is hereby certified that error appears in the above numbered patent requiring correction and that the said Letters Patent should read as corrected below.

In the drawings, strike out the present Sheet 3, comprising Figures 13, 14, 15, 16, 17, and the legend "Fig. 18.", and insert instead the following:

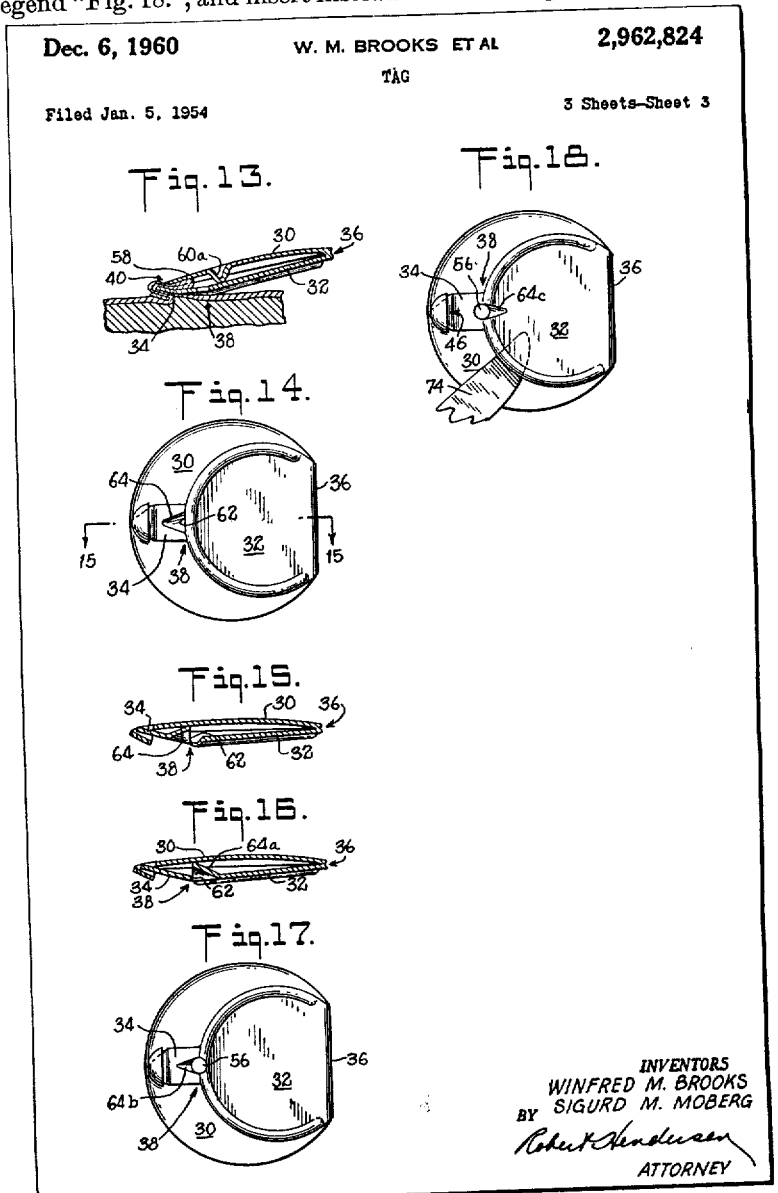

Signed and sealed this 16th day of May 1961.

[SEAL]
Attest:
ERNEST W. SWIDER,
*Attesting Officer.*

DAVID L. LADD,
*Commissioner of Patents.*